United States Patent [19]

Rose et al.

[11] Patent Number: 5,212,000

[45] Date of Patent: May 18, 1993

[54] METHOD FOR PROVIDING AN INNER-SKINNED FUNCTIONALIZED COATING ON THE LUMEN-DEFINING SURFACE OF A HOLLOW TUBE

[75] Inventors: Gene D. Rose; Donald L. Schmidt; William J. Settineri, all of Midland, Mich.

[73] Assignee: The Dow Chemical Company, Midland, Mich.

[21] Appl. No.: 667,014

[22] Filed: Mar. 11, 1991

[51] Int. Cl.$^5$ ............................................. B05D 7/22
[52] U.S. Cl. ................... 428/34.7; 428/35.9; 428/36.91; 427/2; 427/235; 427/238; 427/294; 427/496
[58] Field of Search ............... 427/235, 414, 238, 243, 427/294, 35, 36, 44, 2, 232, 350, 348; 428/34.7, 35.9, 36.91

[56] References Cited

U.S. PATENT DOCUMENTS

| | | | |
|---|---|---|---|
| 938,489 | 11/1909 | James | 427/238 |
| 2,192,869 | 3/1940 | Pearce | 427/235 |
| 2,867,544 | 1/1959 | Hall, Jr. | 427/238 |
| 3,303,042 | 2/1967 | Reed et al. | 117/33.5 |
| 3,457,170 | 7/1969 | Havens | 210/321 X |
| 3,647,521 | 3/1972 | Tulin | 427/238 |
| 3,657,402 | 4/1972 | Stana et al. | 264/45 |
| 3,658,955 | 4/1972 | Chamberlin et al. | 264/45.1 |
| 3,663,263 | 5/1972 | Bodre et al. | 427/235 |
| 3,676,193 | 7/1972 | Cooper, IV et al. | 118/323 X |
| 3,760,949 | 9/1973 | Carey et al. | 210/321 |
| 4,003,393 | 1/1977 | Jaggard et al. | 137/15 |
| 4,216,249 | 8/1980 | Clayton | 427/230 |
| 4,286,341 | 9/1981 | Greer et al. | 427/2 |
| 4,362,122 | 12/1982 | Choinski | 118/600 |
| 4,379,722 | 4/1983 | Scott | 106/287.17 |
| 4,383,783 | 5/1983 | Kruka et al. | 405/171 |
| 4,543,131 | 9/1985 | Purinton, Jr. | 134/8 |
| 4,605,406 | 8/1986 | Cahalan et al. | 427/2 |
| 4,606,942 | 8/1986 | Shriver et al. | 427/233 |
| 4,643,715 | 2/1987 | Isono et al. | 427/2 |
| 4,716,053 | 12/1987 | Eskijian | 427/230 |
| 4,772,391 | 9/1988 | Baker et al. | 210/490 |
| 4,940,541 | 7/1989 | Aoyagi | 427/2 |
| 4,992,226 | 2/1991 | Piez et al. | 427/2 |
| 5,045,352 | 9/1991 | Mueller | 427/238 |
| 5,089,297 | 2/1992 | Koga et al. | 427/238 |

FOREIGN PATENT DOCUMENTS

| | | |
|---|---|---|
| 957910 | 4/1972 | Canada . |
| 1227903A | 9/1983 | U.S.S.R. . |
| 1368054 | 7/1986 | U.S.S.R. . |

OTHER PUBLICATIONS

J. R. Van Wazer, et al., *Viscosity and Flow Measurement*, Inter Science Publishers 1963, pp. 189–199.

L. Lambourne, *Paint and Surface Coatings: Theory and Practice*, Halsted Press, '87, pp. 39–40.

J. D. Ferry, *Viscoelastic Properties of Polymers*, John Wiley and Sons, Inc., 1980, p. 381.

B. Bird, et al., *Dynamics of Polymeric Liquids*, vol. 1, John Wiley and Sons, Inc., 1977, pp. 191–193, pp. 142–143, pp. 208–209, and p. 152.

(List continued on next page.)

Primary Examiner—Michael Lusignan
Assistant Examiner—Diana Dudash

[57] ABSTRACT

This invention provides a method for providing a functionalized inner skin on the lumen-defining surface of a hollow tube using either a Newtonian coating fluid used in combination with a relatively non-Newtonian plug fluid, or a non-Newtonian coating fluid (optionally in combination with a more non-Newtonian plug fluid). This invention enables the facile provision of a functionalized inner skin on the lumen-defining surface of tubes previously deemed difficult to coat, e.g., tubes wherein the inner diameter varies along the length of the tubes, tubes having elliptical or irregular cross-sectional configurations, branched tubes, and tubes having lumens of small diameter, e.g. tubes useful in membrane applications. Preferably, the coating will be dried or cross-linked to promote sustained adhesion and/or to increase the functionality of the coating. In one embodiment, this invention provides a method for imparting a permselective layer upon the lumen-defining surface of a tubular membrane, and/or protective layer therefor.

34 Claims, 2 Drawing Sheets

OTHER PUBLICATIONS

R. W. Whorlow, *Rheological Techniques,* Ellis Harwood Limited, Chichest, 1980, pp. 75–76.

R. J. Ray, et al., *Membrane-Based Hybrid Processes for Energy-Efficient Waste-Water Treatment,* J. Membrane Sci., 28 (1986) pp. 87–106.

L. L. Navickis, et al., *Jour. of Rheol.,* 27(6), 1983, pp. 519–536.

J. P. Hartnett, et al., *Jour. of Rheol.,* 33(4), 1987, pp. 671–679.

A. S. Yoshimura, et al., *Jour. of Rheol.,* 31(8), 1987, pp. 699–710.

G. W. Grovier, et al., *The Flow of Complex Mixtures in Pipes;* Van Nostrand Reinhold Company: New York (p. 186).

METHOD FOR PROVIDING AN INNER-SKINNED FUNCTIONALIZED COATING ON THE LUMEN-DEFINING SURFACE OF A HOLLOW TUBE

BACKGROUND OF INVENTION

This invention pertains to a method for producing an inner-skinned functionalized tube, whereby a functionalized coating is provided on the lumen-defining surface, i.e., the inner surface, of a hollow narrow tube having an inner diameter less than or equal to about one inch. In one embodiment, this invention pertains to a method for imparting a discriminating layer upon the lumen-defining surface of a hollow fiber, producing a hollow fiber membrane.

The following methods are known for coating the external surface of an article, i.e., for producing an exterior-skinned functionalized tube: (1) spreading the coating on the surface using paint brushes, rollers, paint pads or doctor blades: (2) spraying the coating onto the surface using, for example, air-fed spray, airless spray, hot spray or electrostatic spray: (3) flow coating the surface, for example, by dipping, curtain coating, roller coating, or reverse roller coating: and (4) electrophoretic deposition. For a discussion of these application methods, see L. Lambourne, *Paint and Surface Coatings: Theory and Practice*, Editor: Halsted Press: New York, 1987 (pages 39-40).

Methods for providing a functionalized coating on the internal surface of a larger diameter tubular article, by providing an object useful to distribute the coating, such as a ball, bladder, doctor blade, or rag, are also known. In particular, U.S. Pat. No. 3,676,193 teaches drawing a coating bob up the interior of a tubular cylinder to apply a polymeric coating. U.S. Pat. No. 3,657,402 teaches the use of a gravity dropping coating bob to apply a coating fluid to the bore of a tubular reverse osmosis module. U.S. Pat. No. 3,457,170 teaches filling a lumen with a casting fluid and inserting and moving a doctor blade longitudinally to form a film upon the lumen-defining surface.

The above methods cited for providing a functionalized coating on the internal surface of an article suffer the following disadvantages. First, while a bob may suitably coat the internal surface of a tube having a large inner diameter, it proves impractical for coating a tube having a smaller inner diameter, e.g., a tube useful in membrane applications. Second, when a bob drops through a vertically disposed tube, a non-uniform coating may result due to dripping. Third, a bob does not permit the uniform coating of the lumen-defining surface of a tube wherein the inner diameter varies along the length of the tube.

Methods for providing a functionalized coating on the internal surface of a hollow fiber by interfacial polymerization are known. However, interfacial polymerization methods are limited to coating materials that form condensation polymers. This limits the coating materials available.

Providing a functionalized coating on the lumen-defining surface, in contrast to coating the outer surface of a hollow fiber, permits the use of the fiber in high pressure tube-side-feed reverse osmosis applications. In particular, a high pressure tube-side-feed stream presses a lumen-side discriminating layer onto the lumen-defining surface, whereas it would push and eventually detach or breach a discriminating layer from the outer surface of a hollow fiber. Tube-side-feed arrangements afford significant advantages. First, tube-side-feed hollow fiber membranes resist fouling, often problematic in liquid processes. Second, tube-side-feed hollow fibers serve as a pressure vessel, making an external high pressure vessel unnecessary.

Those in industry would find great advantage in a method for imparting a thin, uniform functionalized coating to the lumen-defining surface of a narrow tube. In particular, the method should permit the coating of a tube wherein the cross-sectional configuration of the lumen is circular, elliptical, or irregular. The method should permit the coating of a tube wherein the inner diameter varies along the length of the tube. The method should permit the coating of a lumen-defining surface of a hollow fiber membrane, imparting it with a permselective layer, or a protective layer therefor.

SUMMARY OF INVENTION

Accordingly, this invention provides a method for imparting a thin, uniform polymeric functionalized coating to the lumen-defining surface of narrow tubes of various configurations. In particular, the subject invention in part pertains to a method comprising the following consecutive steps (hereinafter "Embodiment I"):

(a) providing an open-ended hollow tube in part defined by:
  (i) at least one inner surface which defines a lumen,
  (ii) two open ends which communicate through the lumen,
  (iii) a longitudinal axis of the hollow tube, extending between the open ends through the center of the lumen,
  (iv) a maximum cross-sectional area of the lumen taken perpendicular to the longitudinal axis which is less than about 5 $cm^2$;
(b) introducing a first coating fluid comprising a first polymer through one of the open ends into the lumen:
(c) introducing into the lumen a second fluid through an open end such that the second fluid contacts the first coating fluid, the second fluid having non-Newtonian properties, and forming a self-centering plug within the first coating fluid in the lumen: and
(d) applying the first coating fluid to the inner wall by passing the plug through the lumen, coating the inner surface with a first amount of the coating fluid.

The subject invention in part also pertains to a method comprising the following ordered steps (hereinafter "Embodiment II"):

(a) providing a hollow open ended tube in part defined by:
  (i) at least one inner surface which defines a lumen,
  (ii) two open ends which communicate through the lumen,
  (iii) a longitudinal axis of the hollow tube, extending between the ends through the center of the lumen,
  (iv) a maximum cross-sectional area of the lumen taken perpendicular to the longitudinal axis which is less than about 5 $cm^2$;
(b) introducing a coating fluid comprising a polymer through one of the open ends into the lumen, the coating fluid being characterized by non-Newtonian properites or the tendency to increase in viscosity upon solvent loss: and
(c) applying the coating fluid to the inner surface with fluid distribution means, so as to uniformly coat the inner surface with an amount of the coating fluid.

The coating fluid applied through the Embodiment I and II methods will preferably be dried or crosslinked to promote sustained adhesion and/or to impart or increase the functionality of the coating.

This invention also provides a method for imparting a thin, uniform, polymeric functional coating on the inner, lumen-defining surface of a tube wherein the inner diameter varies along the length of the tube, e.g., a tube wherein the cross sectional area continuously increases or decreases along the longitudinal axis of the tube, or a tube comprising two segments of smaller lumen cross sectional areas separated by a bulbous segment of larger lumen cross sectional area. This invention further provides a method for imparting a thin, uniform, polymeric functional coating on tubes of various cross-sectional configurations, e.g., tubes having lumens characterized by circular, elliptical, or irregular cross sections.

This invention also provides an inner-skinned functionalized tube prepared in accordance with one of the above processes, wherein the coating solution comprises a polymer prepared using a hydroxyethyl methacrylate and/or a vinylbenzyltrialkylammonium salt monomer.

The detailed description below, in which all percentages are by weight, unless otherwise indicated, further explains these embodiments and others.

BRIEF DESCRIPTION OF THE DRAWINGS

FIG. 1 is a scanning electron micrograph of an uncoated Amicon P30-20 hollow fiber.

FIG. 2 is a scanning electron micrograph of a tube of FIG. 1 as coated by a 0.5 percent aqueous solution of xanthan gum.

FIG. 3 is a scanning electron micrograph of a tube of FIG. 1 as coated by a 2 percent aqueous solution of the vinyl addition polymer set forth in Example III below.

FIG. 4 is a scanning electron micrograph of a tube of FIG. 1 as coated by a 2 percent aqueous solution of the vinyl addition polymer, as set forth in Example III below, by the passage of a plug comprising a 0.5 percent aqueous solution of xanthan.

DETAILED DESCRIPTION

Figure 1:
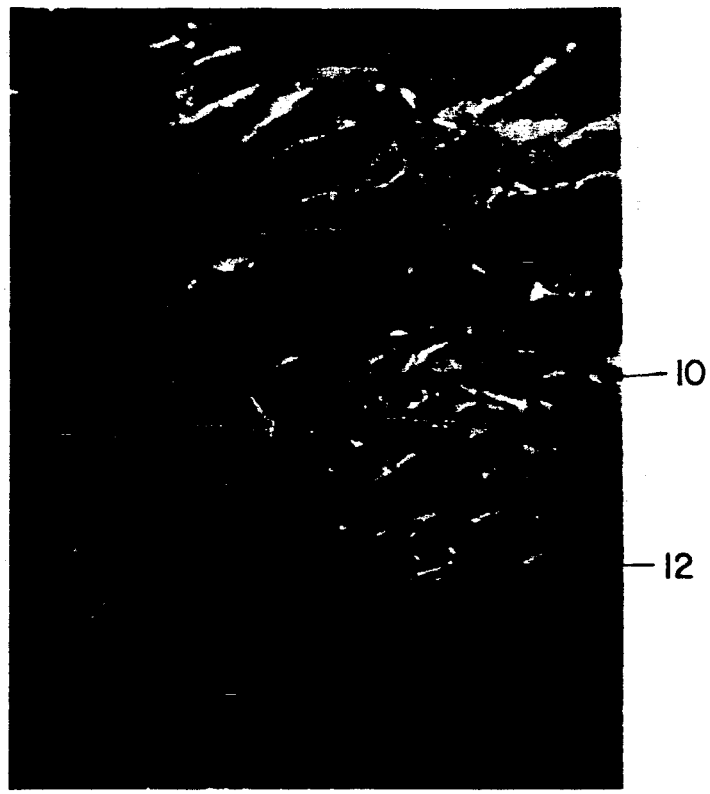
FIGS. 1 through 4 are scanning electron micrographs illustrating the inner-skinned functionalized tubes attainable through this invention. In particular.

By providing fluid coating distribution means, as opposed to a solid coating bob, this invention allows the facile provision of a functionalized, inner skin upon the lumen-defining surface of tubes previously deemed difficult to coat. Such fluid coating distribution means easily pass through constrictions, bends, and valves within the tube, and reform upon passing the irregularity. Thus, this invention allows the provision of a functionalized, inner skin upon the lumen-defining surface of tubes having inner diameters too small to permit the passage of a solid bob, such as tubes having utility in membrane applications, e.g., hollow fibers having an inner diameter between about 0.01 cm and about 2.54 cm. This invention further allows the provision of functionalized, inner skin upon the lumen-defining surface of tubes wherein the inner diameters vary along the length of the tubes, e.g., tubes comprising two segments of smaller inner diameter separated by a segment of larger inner diameter. Further, it allows the provision of a functionalized, inner skin upon the lumen-defining surface of tubes of unusual cross-sectional design, i.e., tubes having lumens characterized by circular, elliptical, or irregular cross-sectional configurations. This invention further allows the provision of a functionalized, inner skin upon the lumen-defining surface of non-linear and branched tubes. In preferred tubes, the ratio of the volume of the lumen to the volume of the tube wall is between 0.1:1 and 600:1, per unit length.

The inventive method utilizes non-Newtonian fluids or fluids which increase in viscosity upon solvent loss. For Newtonian flow, the viscosity of the fluid is independent of the rate of shear. Non-Newtonian fluids, for the purposes of this description, are those fluids which experience a decrease in viscosity when the rate of fluid flow increases. These are sometimes referred to as thixotropic or shear-thinning fluids. Application of a water-based paint to a wall illustrates the behavior of a non-Newtonian fluid. As the roller contacts the wall, the viscosity of the paint decreases, allowing the paint to be spread. Upon removal of the roller from contact with the coating on the wall, the viscosity of the paint increases, allowing the paint to adhere to the wall, preferably without sagging. This invention utilizes non-Newtonian fluids in two fashions.

The Embodiment I method set forth above utilizes a relatively Newtonian coating fluid and a relatively non-Newtonian plug fluid, the plug fluid being provided upstream relative to the coating fluid. Due to the non-Newtonian characteristics of the plug fluid, upon the application of force to the plug, its velocity profile assumes the shape and properties of a self-centering, deformable plug. Thus, upon the application of the force, the plug fluid pushes the coating fluid to the lumen-defining surface. The rapidly moving plug fluid slips over the surface of the adhered coating, and exits the lumen.

The Embodiment II method also set forth above utilizes a coating fluid having non-Newtonian properties. In one particular embodiment, the Embodiment II method utilizes a coating fluid which is initially Newtonian, but which develops a high viscosity while remaining Newtonian or becoming non-Newtonian at the lumen-defining surface due to an increase in solids. This may be accomplished by the passage of gaseous distribution means through the tube which removes the diluent or by forcing the coating fluid through the tube at a volumetric flow rate suitable to effect a partial reverse osmosis concentration thereof. The high viscosity thus attained should not preclude the flowing of the coating fluid through the tube. An inert pressurized gas or liquid, i.e., a gas or liquid which does not interfere with the coating fluid or adversely affect the lumen-defining surface, or additional pressurized amounts of the coating fluid, constitute "fluid distribution means" which may serve to apply the coating to the lumen-defining surface. Subsequently flushing the lumen with additional amounts of an inert pressurized gas or liquid serves to displace residual, non-adhered amounts of the coating fluid from the lumen, and provides a shear force, which further spreads the remaining partially adhered fluid along the lumen-defining surface, providing a uniform coating. The "fluid distribution means" may further constitute a vacuum suitable to pull the non-Newtonian fluid through the lumen.

The use of a non-Newtonian coating fluid (or a Newtonian fluid which develops non-Newtonian properties, or an increased viscosity within the lumen) helps to counteract any Rayleigh instability. Rayleigh instability is the tendency of a liquid film disposed upon a highly curved surface to retract into drops or puddles, due to surface tension forces, causing blockages within lumens having small diameters. The rheological properties of an Embodiment II coating fluid or of an Embodiment I plug fluid resists such surface tension forces, promoting a more stable, uniform coating. Further, the non-Newtonian character of an Embodiment II coating fluid or of an Embodiment I plug fluid resists gravitational forces. This promotes a more uniform coating by inhibiting sagging of the coating into puddles in the tubes.

Suitable non-Newtonian fluids for use as a plug fluid in Embodiment I methods or as a coating fluid in Embodiment II methods may belong to any one of the following subclasses: shear thinning fluids, i.e., power law fluids: Bingham plastics: and shear thinning fluids having a yield value. For further information regarding the flow mechanics of these subclasses of fluids through a tube having a small inner diameter, see J. R. van Wazer, J. W. Lyons, K. Y. Kim, and R. E. Coldwell, *Viscosity and Flow Measurement*; Interscience Publishers, New York, 1963, (pages 189-199), herein incorporated by reference.

To determine if a candidate fluid has suitable non-Newtonian properties, one practicing this invention can create a rheogram, using a computer controlled rheometer. Two such rheometers currently available are the Rheometrics Fluids Spectrometer and the Haake Rotovisco RV20 Viscometer (with the corresponding rotational software package and a Rheocontroller RC20). These and other suitable rheometers plot the shear stress of a fluid ($\tau$) as a function of shear rate ($\dot{Y}$).

As an alternative to obtaining a computer-plotted rheogram, the practitioner may obtain a tabulation of the shear stress or viscosity of a solution at various shear rates. The practitioner may manually plot the tabulated data as a rheogram. The following discussion, only for the sake of simplicity, and due to the ready availability of suitable software packages, is phrased in terms of computer-created rheograms.

The Herschel Bulkley equation, a general formula useful to describe Newtonian and non-Newtonian fluid behavior, provides that:

$$\tau = \kappa \dot{Y}^n + \tau_o$$

where $\tau$ is shear stress in dynes/cm$^2$, $\tau_o$ is an empirically realized yield value in dynes/cm$^2$, $\kappa$ is a constant having units of (dynes)(sec)$^n$/cm$^2$, $\dot{Y}$ shear rate in sec$^{-1}$, and n is a dimensionless exponential constant. Yield value ($\tau_o$) is the shear stress required to induce the fluid to flow.

When $\tau_o$ is greater than zero and n is less than 1, the Herschel Bulkley equation describes a shear-thinning fluid having a yield value. When $\tau_o$ is zero and n is less than 1, i.e., the fluid has no yield value, the Herschel Bulkley equation describes a shear thinning fluid, i.e., a power law fluid. When $\tau_o$ is greater than zero and n is 1, the Herschel Bulkley equation describes a Bingham plastic. When $\tau_o$ is zero and n is 1, the Herschel Bulkley equation describes a Newtonian fluid (wherein the constant $\kappa$ equals the viscosity of the fluid).

Non-Newtonian fluids, at any given shear rate, may be described by two viscosities. The true viscosity is the slope of the curve plotted in the above-described rheogram at a particular point, i.e. $\delta \tau / \delta \dot{Y}$. The apparent viscosity is the slope of a line drawn from the origin to the particular point on the curve in question, i.e., $\tau / \dot{Y}$. Note that for Newtonian solutions, the true viscosity equals the apparent viscosity at all points.

The most preferred non-Newtonian fluids will have an exponential constant (n) less than 1 and a yield value ($\tau_o$) which is relatively high. Such a fluid would not tend to flow absent the application of a force. Upon the application of such a force, however, the fluid would flow in accordance with a non-Newtonian velocity profile. In the most preferred velocity profile, the velocity of the fluid at points along the longitudinal axis of the lumen is substantially equal to that at points near the lumen-defining surface.

A computer controlled rheometer can fit the measured shear stress and shear rate values to the Herschel Bulkley equation (or other selected models useful to describe the rheological properties of non-Newtonian fluids) through a least squares regression analysis. By examining the shape of the computer-generated plot, and the values for the exponential constant (n) and the yield value ($\tau_o$), the practitioner may easily determine if a candidate fluid has suitable non-Newtonian properties to indicate its utility as a plug in Embodiment I cases, or as a coating fluid in Embodiment II cases. As set forth above, the rheogram should identify the solution as a shear thinning power law fluid, a Bingham plastic or a shear thinning fluid having a yield value.

Suitable non-Newtonian fluids should be able to move through the lumen without the aid of a force greater than the burst pressure (or the recommended operating pressure) of the tube. One skilled in the art can determine if a solution identified by the rheogram as non-Newtonian meets this criterion by attempting to move it through the desired lumen without fracturing the lumen-defining surface. In the alternative, he or she may make predictions as to the pressure required to move a fluid through a lumen from the above-described rheograms.

One skilled in the art will recognize, however, that forces technically in excess of the burst pressure may be tolerated, provided a counteracting pressure is applied to the exterior surface of the tube. Merely for convenience and clarity of explanation, the ensuring discussion assumes that no such counteracting pressure is applied.

Knowledge of the rheological constants for a given fluid, e.g., the constant (k) and the exponential constant (n) and the yield value ($\tau_o$) of a non-Newtonian fluid may aid one practicing this invention in determining if it may move through the lumen without exceeding the burst pressure (or the recommended operating pressure) of the tube, i.e., if the pressure drop involved in pushing the fluid through the lumen exceeds the burst pressure (or recommended operating pressure of the tube). In addition to estimating the yield value ($\tau_o$) and the exponential constant (n), as set forth above, a computer controlled rheometer, can likewise estimate the constant (k) of a given fluid. To simplify further calculations, the computer can fit the measured data to the power law fluid model. While not wishing to be bound by theory, by way of example, we have found the following formula to be useful in making this determination in the case of fluids for which the rheogram is fit to the power law model:

$$Q = \pi (\Delta p / [2\kappa L])^{1/n} (n / [3n+1]) R^{(3n+1)/n}$$

where Q is the volumetric flow rate in cm$^3$/sec, $\Delta p$ is the pressure drop resulting as the fluid is forced through the lumen in dynes/cm$^2$, R is the radius of the lumen in cm, L is the length of the tube in cm, and $\kappa$ and n are the rheogram-estimated constant and exponential constant, respectively. See G. W. Govier and K. Aziz, *The Flow of Complex Mixtures in Pipes*; Van Nostrand Reinhold Company: New York (page 186). Thus, inserting the rheogram estimated values for $\kappa$ and n, as well as the inner radius and length of the desired tube, leaves Q and $\Delta p$ as unknowns. One practicing this invention may merely select a volumetric flow rate (Q) such that the resultant pressure drop ($\Delta p$) does not exceed the burst pressure (or the recommended operating pressure) of the tube.

Again, not wishing to be bound by theory, we have found the following formula to be useful in selecting suitable volumetric flow rates in the case of shear thinning fluids, i.e., power law fluids:

$$Re' = 8 \rho R^n V^{2-n} n^n / [(3n+1)^n \kappa]$$

where $Re'$ is the generalized Reynolds number, $\rho$ is the density of the fluid in g/cm$^3$, R is the radius of the lumen in cm, V is the fluid velocity in cm/sec, and n and $\kappa$ are the rheogram-estimated constant and exponential constant of the fluid, respectively. See G. W. Govier and K. Aziz, *The Flow of Complex Mixtures in Pipes*; Van Nostrand Reinhold Company: New York (page 189). Preferably, in Embodiment I methods, the volumetric flow rate should be such that the fluid exhibits purely laminar, rather than a combination of turbulent and laminar flows, to inhibit mixing between the coating and plug fluids. At generalized Reynolds numbers less than 2,000, the fluid will be in laminar flow. (The transition from laminar to turbulent flow occurs at Reynolds numbers from about 2,100 to about 3,000 as the exponential constant (n) of the fluid varies from 1 to about 0.4. See R. W. Whorlow, *Rheological Techniques*, Ellis Harwood Limited: Chichest, 1980 (pages 75–76)). Substituting the known fluid density ($\rho$), radius of the lumen (R), and rheogram-determined constant ($\kappa$) and exponential constant (n) allows a solution for the fluid velocity (V). The product of the fluid velocity (V) and the cross sectional area of the lumen (($\pi R^2$) in the case of a circular cross section) will provide a suitable volumetric flow rate (Q) at which the given fluid may pass through the tube in laminar flow. This estimates the maximum flow rate, which will preferably not be exceeded, for the plug fluid in Embodiment I methods. The practitioner can calculate a maximum pressure drop corresponding to this maximum flow rate using the equation set forth above relating volumetric flow rate (Q) and pressure drop $\Delta p$. In Embodiment II methods, where turbulent flow is not problematic, the flow rate is limited principally by the burst pressure (or the recommended operating pressure) of the tube.

The practitioner will appreciate that since these calculations are made using empirical models, extrapolation of the models may lead to the prediction of unreasonable physical situations. For instance, pseudoplastic, i.e., shear thinning fluids, follow a power law function throughout only a limited range of shear stresses. Thus, although the equations may suggest the feasibility of high volumetric flow rates, the corresponding high shear rates involved may be outside the range in which the fluid will exhibit power law behavior. See, G. W. Govier and K. Aziz, *The Flow of Complex Mixtures in Pipes*; Van Nostran Reinhold Company: New York, 1972 (pages 191–192); and J. R. van Wazer, J. W. Lyons, K. Y. Kim, and R. E. Coldwell, *Viscosity and Flow Measurement*; Interscience Publishers: New York, 1963 (page 17).

To predict whether a given fluid will exhibit power law behavior at a given volumetric flow rate, the practitioner can determine if the apparent viscosity is greater than that of the solvent for the polymer (0.01 poise, in the case of water). The practitioner can calculate the shear rate for a given flow velocity (V) using the following equation:

$$\dot{\gamma} = \frac{4V}{R} \left( \frac{1 + 3n}{4n} \right)$$

where $\dot{\gamma}$, V, R, and n are as defined above. See G. W. Govier and K. Aziz, *The Flow of Complex Mixtures in Pipes*; Van Nostran Reinhold Company: New York, 1972 (page 188). From the calculated shear rate, the practitioner can calculate the expected apparent viscosity ($\eta_A$) of the fluid using the following equation:

$$\eta_A = \kappa \dot{\gamma}^{n-1}$$

where $\eta_A$ is the apparent viscosity having units of dynes/cm$^2$, and $\kappa$, $\dot{\gamma}$, and n are as defined above. The calculated apparent viscosity ($\eta_A$) will preferably be greater than that of the solvent for the polymer to ensure power law behavior. The prediction of such anomalies receives further treatment in Example Four below.

The practitioner will further appreciate that a selected volumetric flow rate should not be so high as to provide a pressure through the lumen capable of effecting an excessive reverse osmosis separation of the fluid. The practitioner may determine the volumetric flow rate at which such a separation would occur by empirical means. For instance, the practitioner could attempt to move the fluid through the lumen at the volumetric flow rate, as calculated above. If the fluid passes through the lumen without the appearance of water droplets on the outer surface of the tube, the volumetric flow rate is less than that at which a reverse osmosis separation would occur. If water droplets appear on the outer surface of the tube during the passage of the fluid through the lumen of the tube, the practitioner may decrease the volumetric flow rate until this reverse osmosis separation no longer occurs. It should be noted that a non-excessive reverse osmosis separation could advantageously be used to de-water a coating solution and thereby increase its viscosity and its non-Newtonian character at points along the lumen-defining surface, e.g., and convert a solution Newtonian when introduced into the lumen to a non-Newtonian solution at least at points along the lumen-defining surface, through a relatively high pressure application of the solution to the lumen-defining surface.

The practitioner will recognize that several factors influence the rheology of a given fluid. For instance, one can increase the non-Newtonian properties of a fluid by providing a higher molecular weight polymer and/or by providing a polymer in a higher concentration. J. Ferry, *Viscoelastic Properties of Polymers*; John Wiley and Sons, Inc.: New York, 1980 (page 381). *Handbook of Water-Soluble Gums and Resins*, R. Davidson, Editor in Chief; McGraw-Hill Book Company: New York, 1980 (pages 3–8). The presence of interacting groups within a polymer may likewise serve to increase the non-Newtonian properties of a solution thereof. B. Bird, R. Armstrong, and O. Hassanger, *Dynamics of Polymeric Liquids*, Vol. 1; John Wiley and Sons, Inc.: New York, 1977 (pages 191–193). Increasing the temperature, e.g., from 388K to 513K, tends to decrease the non-Newtonian properties of a solution. *Dynamics of Polymeric Liquids*, at pages 142–143.

Most macromolecular fluids are shear thinning. Values of the exponential constant (n) between about 0.15 and 0.6 are common and are preferred. For instance, Bird et al. report exponential constants (n) of 0.5088, 0.189 and 0.532 at 293K for a 0.5 percent aqueous solution of hydroxyethylcellulose, a 2.0 percent aqueous solution of hydroxyethylcellulose, and a 1.0 percent aqueous solution of poly(ethylene oxide). They report corresponding values for the constant ($\kappa$) of 8.4, 935, and 9.94 dynes.sec$^n$/cm$^2$, respectively. *Dynamics of Polymeric Liquids* at pages 208–209.

A 0.5 percent aqueous fluid of xanthan gum provides a useful non-Newtonian plug fluid in the Embodiment I method and a useful non-Newtonian coating solution in Embodiment II method. A 3 percent aqueous solution of cetyltrimethylammonium sulfate enjoys similar utility. Other non-Newtonian solutions at 298K include a 2 percent solution of polyisobutylene in Primol (a pharmaceutical grade white oil: CAS number = 8012-95-1), a 1.5 percent solution of polyacrylamide in a water/glycerine mixture, and a 7 percent solution of aluminum laureate in a mixture of decalin and m-cresol. *Dynamics of Polymeric Liquids* at page 152, citing J. D. Huppler, E. Ashare, and L. A. Holmes, *Trans. Soc. Rheol*, 11, 159–179 (1967). A 1 percent aqueous solution of KELZAN (a xanthan gum sold by the Kelco Company) and a 0.1 to 0.2 percent aqueous solution of CARBOPOL 940 (an acrylic acid polymer) are likewise shear thinning.

One particularly effective Newtonian type coating fluid useful to provide a functionalized inner skin on the lumen-defining surface of smaller diameter tubes using the Embodiment I method comprises a 2 percent aqueous solution of a vinyl addition polymer of the following monomers: 49.5 percent 2-hydroxyethyl methacrylate (HEMA), 30.5 percent vinyl benzyl dimethylsulfonium chloride, 12 percent methacrylic acid, and 8 percent 9N10 methacrylate (nonylphenoxydecaethoxyethyl methacrylate). The coating fluid may similarly comprise a 2 percent aqueous solution of a vinyl addition polymer of the following monomers: 50 percent HEMA, 40 percent vinylbenzyltrialkylammonium chloride (wherein the alkyl groups preferably independently comprise a $C_1$ to $C_4$ hydrocarbon radical), and 10 percent 9N10 methacrylate. Such preferred solutions also contain 0.25 percent FLUORAD FC134 (a fluorocarbon surfactant available from the 3M Corporation, St. Paul, Minn.) on a solids basis to enhance the wetting of the polymeric hollow fiber membranes. HEMA polymers, i.e., such as the recited vinyl addition polymers, enjoy particular utility in membrane applications. Such polymers are more stable to chlorine than condensation polymers, and thus would provide more chlorine resistant composite membranes.

The adhered coating will preferably be substantially insoluble in the plug fluid, to prevent dissolution of the adhered coating by the passage of the plug. For instance, the coating will preferably be less than one percent soluble in the plug fluid. In the alternative, the viscosity difference between mutually soluble coating and plug fluids should be such as to prevent mixing. Preferably, the ratio of the apparent viscosity of the plug fluid to that of the coating fluid should be at least about 2:1, at any applied shear rates less than about 10 sec$^{-1}$.

The thickness of the resultant coating is a function of the rheological properties of the coating fluid (and in Embodiment I methods the plug fluid), the flow conditions, and the physical dimensions of the lumen-defining surface. In general, as the power-law model fluid velocity (V) increases, the thickness of the coating decreases. Further, the same coating thickness can be obtained for a wide variety of rheogram determined constants ($\kappa$) and exponential constants (n). For instance, if the exponential constant (n) has the same value for different fluids, such fluids may produce coatings of the same thickness, provided the fluid velocity selected is appropriate for the value of the constant ($\kappa$) of each particular fluid. As the value of the constant ($\kappa$) increases, the non-Newtonian fluid velocity (V) should decrease to achieve such similar thicknesses. Similarly, if the constant ($\kappa$) has the same value for different fluids, such fluids may produce coatings of the same thickness, provided the fluid velocity (V) selected is appropriate for the value of the exponential constant (n) of each particular fluid. As the value of the constant (n) decreases, the non-Newtonian fluid velocity (V) should decrease to achieve such similar thicknesses.

In general, the coating should be thick enough to uniformly cover the lumen-defining surface. In the case of coatings for the lumen-defining surface of a membrane, the coating preferably will be essentially continuous and thick enough to either promote selectivity or to provide some measure of protection for an underlying, permselective layer. Correspondingly, the coating preferably will not be so thick as to impede the permeability of select components through the membrane.

Should the resultant coating exhibit sagging, the practitioner may correct the problem by adjusting one or more of the following parameters: increasing the concentration and/or molecular weight of the polymer, providing increased interactions within the polymer, decreasing the temperature of the solution, and increasing the volumetric flow rate of the fluid (if a thinner coating is tolerable). Increasing the concentration and/or molecular weight of the polymer, and providing increased interactions within the molecule each tend to increase the yield value of the fluid. In the alternative, the practitioner may select non-Newtonian fluids having a inherently high yield values, such as certain starch and cellulose graft copolymers, CARBOPOLS, carboxymethyl starch gels, and starch granules, highly swollen in water. L. L. Navickis and E. B. Bagley, *Jour. of Rheol.*, 27(6), 519–536 (1983). A 2,500 wppm solution of CARBOPOL 960, having a density of 1,008 g/cm$^3$, has an estimated yield value ($\tau_o$) between 14 and 107 dynes/cm$^2$. J. P. Hartnett and R. Y. Z. Hu, *Jour. of Rheol.*, 33(4), 671–679 (1989).

While the invention preferably utilizes macromolecular non-Newtonian fluids, non-polymeric non-Newtonian fluids may also enjoy utility. For example, emulsions of between 3.43 and 39.5 volume percent paraffin oil in a 20 percent by weight aqueous solution of an anionic surfactant exhibit yield values ($\tau_o$) between about 50 and about 550 dynes/cm$^2$. A. S. Yoshimura, R. K. Prud'homme, H. M. Princen, and A. D. Kiss, *Jour. of Rheol.*, 31(8), 699–710 (1987).

Through adaptation routine to those skilled in the art, the inventive process may yield different coating configurations. For instance, the Embodiment I method optionally further comprises removing the residual plug fluid prior to or after curing the adhered polymer. The following list sets forth examples of suitable removal means: (1) washing or purging the lumen with an inert fluid, gaseous or liquid, which carries the residual plug fluid without disturbing the adhered polymer; (2) heating the tube to volatilize the residual plug fluid; and (3) oxidizing the residual plug fluid. Those skilled in the art may readily ascertain other suitable removal means.

The Embodiment I method utilizes a plug fluid which optionally comprises a second polymer. As the plug fluid displaces the coating fluid or subsequent to displacement, the plug fluid contacts the adhered first polymer for a period of time sufficient to promote adhesion of the second polymer thereto. Residual, i.e., non-adhered amounts of the plug fluid may be removed, e.g., by washing the lumen, prior to or after curing, with an inert fluid, gaseous or liquid, which removes the residual plug fluid without substantially eroding the adhered coating polymers. Curing may yield a composite membrane, i.e, wherein the adhered second polymer forms part of the discriminating layer of the membrane. In the alternative, the adhered second polymer may serve to provide some measure of protection for the permselective layer, e.g., from the abrasive and potentially destructive force of a high pressure tube-side-feed stream, or from certain chemical constituents of the feed stream such as chlorine. Preferably, the adhered second polymer will not significantly decrease the permselectivity of the membrane. In one particular embodiment, one polymer will be hydrophilic and the other hydrophobic. In another particular embodiment, the coating fluid will impart a permselective layer upon the lumen-defining surface of a hollow fiber, and the plug fluid will comprise a relatively high molecular weight vinyl addition copolymer of HEMA. To promote better longevity, a protective layer may be chemically attached to the permselective layer, i.e. through crosslinking.

Additional plug fluids provided in sequence will provide multi-layered coatings or membranes. Likewise, consecutively provided coating fluids followed by one plug fluid will provide multi-layered coatings or membranes. In one embodiment, consecutively provided fluids comprising the same polymer will decrease the presence of pinholes in the coating. To avoid the dissolution of an applied polymer, the practitioner may cure each polymer before the passage of the next fluid.

The Embodiment I and Embodiment II methods work well on both porous and nonporous tubes with the pore size being a function of the application contemplated. For instance, the pore size will preferably be between about 7 and about 10 Angstroms for reverse osmosis applications, between about 10 and about 25 Angstroms for nanofiltration applications, between about 25 and about 1,000 Angstroms for ultrafiltration applications, and between about 1,000 and about 30,000 for microfiltration applications. The pore sizes for microfiltration membranes may be determined by scanning electron microscopy. The pore sizes for ultrafiltration membranes may be determined by transmission electron microscopy or, in the case of pore sizes greater than about 100 Angstroms, by scanning electron microscopy. Pore sizes for nanofiltration and reverse osmosis membranes are typically inferred from operating conditions, such as salt rejections and molecular weight cutoffs. The subject process applies particularly well to hollow fibers having an average pore size up to about 50 Angstroms.

Should the practitioner not wish the fluid to enter the pores of a porous tube, he or she should select a polymer having a molecular weight sufficient to preclude access to the pores and/or a tube having pores too small to permit passage by the selected polymer. The practitioner could also maintain a pressure on the outer surface of the tube to inhibit passage through the pores.

In another embodiment, the coating fluid will pass into the pores, imparting a coating upon the pore-defining surface. In a particular embodiment, the coating fluid and the plug fluid will comprise the same polymer, the molecular weight of the polymer in the coating fluid being low enough to permit passage into the pores and the molecular weight of the polymer in the plug fluid being high enough to preclude passage into the pores.

In another embodiment, the Newtonian fluid will fill the pores, precluding the non-Newtonian fluid from doing so. The Newtonian fluid filling the pores will later be removed, producing a coated membrane having substantially coating-free pores. See R. L. Riley, G. R. Hightower, and C. R. Lyons, Applied Polymer Symposium No. 22, 1973 (pages 255–267, see especially, page 258).

In another embodiment, the tube comprises two regions of different composition. The polymer within the coating fluid may adhere to one region exclusive of the other, providing a partially coated tube. In an Embodiment I method, the polymer within the plug fluid may adhere to the non-coated region. Upon curing, this provides a lumen characterized by regions of distinct coatings, without necessitating the joinder of two tubes prior or subsequent to curing. A practitioner may produce such a tube by introducing a coating solution only part way through a first open end, providing the plug at the end opposite the first open end, and pushing the plug through the lumen and out the first open end. In the alternative, the polymer within the plug solution may adhere to the adhered first polymer, without adhering to the non-coated region. Upon curing, this provides a tube having a bi-layer coating in one region, and no coating in another.

The self-centering characteristics of non-Newtonian solutions permit the provision of a functionalized inner skin on the lumen-defining surface of variable diameter tubes, which heretofore were difficult to coat uniformly. For example, this invention permits the provision of a functionalized inner skin on the lumen-defining surface of tubes characterized by at least two regions, the inner diameter of the tube throughout one of the regions being greater than that throughout at least one other region. Thus, for instance, the tube may comprise two smaller diameter segments separated by and joined to a larger diameter, bulbous region. Unlike solid object plugs and bobs, which cannot conform to variable inner diameters, non-Newtonian coating fluids and/or plug fluids provide a means for applying a coating along the length of such tubes. Preferably, the ratio of the cross sectional area of the lumen at the largest diameter point to the cross sectional area of the lumen at the smallest diameter point will be less than about 10 to 1.

The inventive process also applies to a tube having a non-circular cross-sectional configuration, such as an elliptical or otherwise irregular tube. Such an irregular tube may result as a hollow fiber, having a generally circular cross sectional area, is wound into a spiral structure, deforming the cross sectional shape of the fiber and corresponding lumen in the process. Such an irregular tube may also result in the formation of a hollow fiber module wherein both ends of each U-shaped hollow fiber emerge from the same end of the potting material for the fibers. See, e.g., U.S. Pat. No. 3,760,949.

The maximum cross sectional area of the lumen of a tube, regardless of its geometric shape, should not be so great as to preclude a uniform coating of the lumen-defining surface by either the Embodiment I or the Embodiment II method. In particular, the maximum cross sectional area of the lumen should not be so great that the non-Newtonian properties of the plug fluid of the Embodiment I method or the coating fluid of the Embodiment II method are insufficient to counteract the surface tension forces and the resultant Rayleigh instability. More specifically, the maximum cross sectional area of the lumen should be less than about 5 cm$^2$. More preferably, the maximum cross sectional area of the lumen should be less than about 1.5 cm$^2$. Even more preferably, the maximum cross sectional area of the lumen should be that of a hollow fiber membrane, e.g., about $8 \times 10^{-3}$ cm$^2$ or about $2 \times 10^{-3}$ cm$^2$, as in the case of an Amicon P30-20 hollow fiber membrane. Hollow fibers wherein the cross sectional area of the lumen is as low as about $7.8 \times 10^{-5}$ cm$^2$ may likewise be coated by the subject method. These preferred values correspond to lumen diameters of about 2.5 centimeters, 1.25 centimeters, 0.1 centimeter, 0.05 centimeters, and 0.01 centimeters, respectively.

The inventive method applies to the provision of a functionalized inner skin on the lumen-defining surface of larger diameter tubes, provided means are taken to compensate for the effects of surface tension and gravity, i.e., by increasing the yield value ($\tau_o$) and the apparent viscosity of the fluid. Non-rheological means may also be taken to permit the utilization of larger diameter tubes. For instance, rotating the tube along its longitudinal axis during the application, drying and/or curing of the coating enables the uniform coating of larger diameter tubes.

The minimum cross sectional area of the lumen principally depends on whether a viscous, non-Newtonian fluid may be pumped through the lumen without blockage, and without exceeding the burst pressure (or the recommended operating pressure) of the tube. Calculations set forth above for determining appropriate volumetric flow rates (Q) at which the non-Newtonian fluid may be pumped without the pressure drop ($\Delta p$) exceeding the burst pressure (or the recommended operating pressure) of the tube may assist one practicing this invention in selecting a tube having a suitable burst strength and a lumen with a suitable cross sectional area. Such calculations indicate that this invention permits the coating of tubes having an inner diameter of 0.01 cm (100$\mu$) and a length of 25 cm by a non-Newtonian fluid characterized by a constant ($\kappa$) of 15, an exponential constant (n) of 0.3, and a yield value ($\tau_o$) of zero. (For the recited values and a Reynolds number of 2000, the estimated pressure drop ($\Delta p$) is 116 psi. R. J. Ray, J. Kucera-Gienger, and S. Retzlaff, in "Membrane-Based Hybrid Processes for Energy-Efficient Waste-Water Treatment", *J. Membrane Sci.*, 28 (1986) 87–106, disclose hollow fibers having burst pressures as great as 1,000 psi).

Embodiment I methods direct the provision of the plug fluid at one end of the tube. For instance, a syringe connected to the tube may contain the plug fluid. A hose may connect the syringe to a gas supply. Suitable gasses are non-interfering, e.g., nitrogen, argon, or air. The gas flow may exert pressure on the plug fluid, serving to direct it through and at least partially displace it, and any non-adhered coating fluid from the tube. In Embodiment II methods, a syringe may inject the coating fluid into the lumen. A hose may connect the syringe to a gas supply. The gas flow may exert pressure on the coating fluid, serving to apply it to the lumen-defining surface and to displace excess amounts from the tube. The gas pressure utilized should neither inhibit adherence of the coating to the lumen-defining surface, nor exceed the burst pressure of the tube.

Sufficient force to drive the plug fluid of the Embodiment I method, or the coating fluid of the Embodiment II method, may further be provided by a pressurized non-interfering liquid. A non-interfering liquid is soluble in the coating fluid less than about 1 percent, and does not adversely affect the lumen-defining surface. The non-interfering liquid will preferably have a sufficient vapor pressure to be removed by a subsequent gas purge.

In the alternative, a vacuum may effectively displace the non-Newtonian fluid. Again, the pressure utilized should neither inhibit adherence of the coating to the lumen-defining surface nor exceed the burst pressure of the tube. Such a vacuum should be applied at the end of the tube remote from the plug in Embodiment I methods. The vacuum should be applied to an end useful to draw the coating through the lumen in Embodiment II methods.

The coating fluid need not completely fill the tube prior to displacement. The action of the plug (in Embodiment I systems) or the fluid distribution means (in Embodiment II systems) preferably serve to apply the coating fluid provided at one end of the tube uniformly upon the lumen-defining surface, e.g., as a roller spreads paint. Enough coating fluid should be available at the end of introduction, however, to ensure a continuous coating of the tube to the desired thickness.

Curing or crosslinking may be accomplished by a number of means. An appropriate method of curing or crosslinking is a function of the characteristics and structure of the polymeric material in question. For instance, one could expose the coated hollow fiber to beta or gamma radiation to effect the cure or crosslinking. In the case of a polyelectrolyte of a vinylbenzyltrimethylammonium salt monomer to be crosslinked by gamma radiation, the molecular weight of the polymer will preferably be between about 50,000 and about 1,000,000 Daltons, with molecular weights between about 100,000 and 700,000 Daltons being especially preferred. In the alternative, one could expose certain coated polymers to a cure initiator or crosslinking agent. Some polymers will cure or crosslink upon heating at moderate temperatures. In one embodiment, the plug solution will include a catalyst, suitable to initiate curing or crosslinking of the adhered polymer.

In some cases, it may not be preferred to continue the crosslinking until a complete cure is achieved. In such cases, it may be preferred to merely crosslink the polymeric material to an extent sufficient to render it insoluble in the coating fluid and/or plug fluid.

Tubes coated with e.g., a polyelectrolyte of a vinylbenzyltrialkylammonium salt monomer may be effectively crosslinked using either beta or gamma radiation. Preferred dosages of beta radiation suitable to crosslink such coatings within a single hollow fiber are those between about $0.25 \times 10^6$ rads and about $30 \times 10^6$ rads, with dosages between about $0.5 \times 10^6$ rads and about $10 \times 10^6$ rads, being particularly preferred. Preferred dosages of gamma radiation suitable to crosslink such coatings within a single hollow fiber or within the hollow fibers of an assembled module are those between about $0.25 \times 10^6$ rads and about $30 \times 10^6$ rads, with dosages between about $0.5 \times 10^6$ rads and about $10 \times 10^6$ rads being particularly preferred.

Some polymeric coatings may be dried to remove water or solvent prior to crosslinking. In contrast, other polymeric coatings, e.g., coatings comprising a polyelectrolyte of a vinylbenzyltrialkylammonium salt monomer, upon crosslinking, will preferably exist in a water-containing gel state, i.e., crosslinking an adhered aqueous coating solution will preferably involve the entrapment of water molecules within the polymeric matrix. The adhered polymeric coating will preferably comprise between about 1 and about 99 percent water prior to crosslinking. In general, the higher the water content, the more open the crosslinked polymeric network. Thus, for example, for microfiltration applications, which require an open polymeric network to facilitate the passage of relatively large molecules, a higher water content is preferred. For microfiltration applications, the adhered polymeric coating will preferably comprise between about 40 an about 95 percent water prior to crosslinking. In contrast, for reverse osmosis applications, which require a tight polymeric network to enable discrimination between water molecules and solvated ions, a lower water content is preferred. For reverse osmosis applications, the adhered polymeric coating will preferably comprise between 1 and 80 percent water prior to crosslinking. In the case of beta and gamma radiation, an increased radiation dosage leads to increased crosslinking, i.e., a tighter polymeric network.

Tubes coated by the inventive method may comprise any suitable material which the coating fluid can wet and to which the polymer within the coating fluid can adhere. Plastic, e.g., polyethylene, metal, and glass tubes are particularly suitable. One can promote adhesion to a material which does not coat readily, e.g., glass, through the use of a coupling agent. Such coupling agents have two reactive sites, the first reacting with the surface to be coated, and the second with the coating material. In the case of metal tubes, the coating fluid may comprise a compound suitable to improve the corrosion resistance of the tube. Polysulfone hollow fibers or any tube suitable in membrane applications may likewise find utility.

One skilled in the art will appreciate the wide-spread applicability of the subject invention. In brief, this invention provides tubes having functionalized inner skins, wherein "functionalized" is understood to mean "suitable to serve a particular function or purpose." For instance, this invention provides a method for imparting a protective coating onto the lumen-defining surface of a hollow tube, e.g., a coating which inhibits fouling of hollow fiber membranes. This invention further provides a method for imparting a permselective layer upon the lumen-defining surface of a hollow fiber membrane. This invention may be useful to provide a protective layer for a lumen-side permselective layer. This invention may further be useful to heparinize medical tubings and membranes, such as those found in heart-lung machines. Further, this invention may be useful in the repair of tubes, i.e. wherein the coating fluid fills defects in the lumen-defining surface. This invention further provides a method for altering the wettability of the lumen-defining surface of a hollow tube, e.g., by the use of a coating fluid comprising a copolymer of a hydroxyethyl methacrylate monomer. Individual tubes may be treated or an assembly of tubes, e.g., a hollow fiber module containing a number of hollow fibers.

Figure 2:
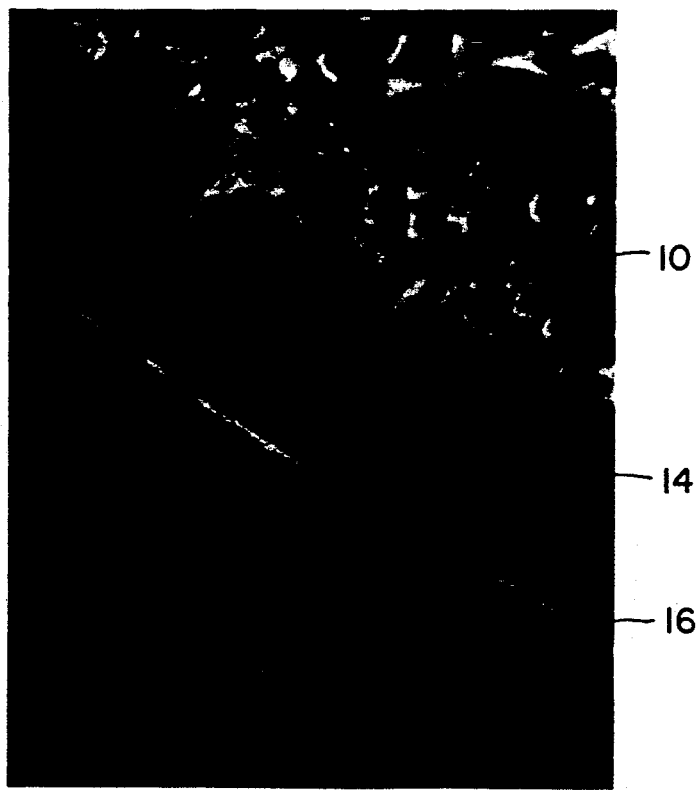
Figure 3:
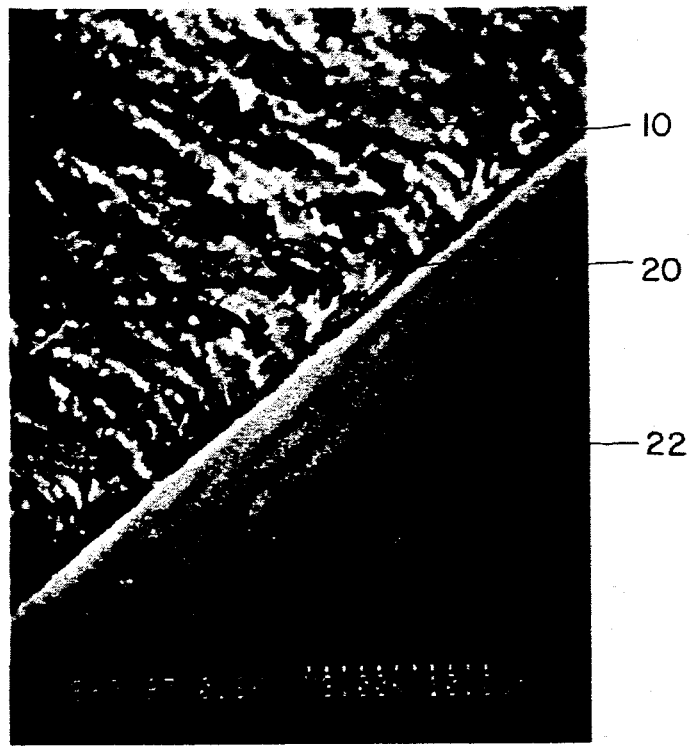
Figure 4:
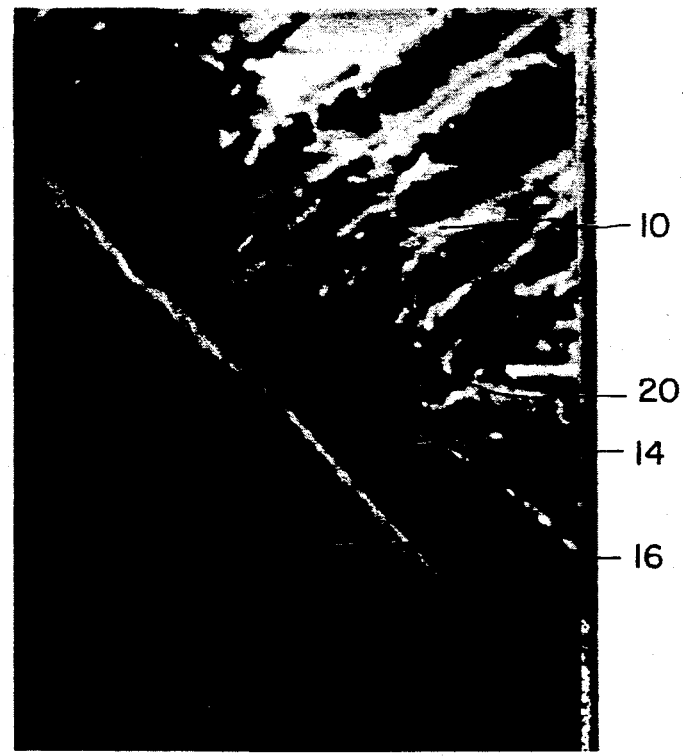

FIGS. 1 through 4 illustrate the efficacy of the subject process. In particular, FIG. 1 is a scanning electron micrograph of an uncoated Amicon P30-20 hollow fiber. FIG. 2 is a scanning electron micrograph of a tube of FIG. 1 as coated by a 0.5 percent aqueous solution of xanthan gum FIG. 3 is a scanning electron micrograph of a tube of FIG. 1 as coated by a 2 percent aqueous solution of the vinyl addition polymer set forth in Example Three below. FIG. 4 is a scanning electron micrograph of a tube of FIG. 1 as coated by a 2 percent aqueous solution of the vinyl addition polymer, as set forth in Example Four below, by the passage of a plug comprising a 0.5 percent aqueous solution of xanthan. In each FIGURE, 10 is a cross sectioned portion of the fiber wall, 12 is an uncoated lumen-defining surface, 14 is an adhered layer of xanthan solution, 16 is the lumen-defining surface having an adhered layer of the xanthan solution, 20 is an adhered layer of the coating solution, and 22 is the lumen-defining surface having an adhered layer of the coating solution.

FIG. 3 illustrates the coating attainable by a Newtonian coating solution, which during its application dewaters and becomes sufficiently viscous and/or non-Newtonian, at least at points along the lumen-defining surface.

The following examples will further explain the subject invention without limiting the scope thereof.

EXAMPLE ONE

This example illustrates the selection of a non-Newtonian fluid.

A 0.5 weight percent solution of xanthan gum in water is prepared. This solution has a density of 1.0 gram/cm$^3$. A rheogram is taken of the solution. The data are fit to the power law fluid model. The values of the constant ($\kappa$) and the exponential constant (n) are 15 and 0.3, respectively.

A suitable fluid velocity is calculated in accordance with the following formula:

$$Re' = 8\rho R^n V^{2-n} n^n / [(3n+1)^n \kappa]$$

as set forth above in the detailed description. Using a Reynolds number (Re') of 2000, a fluid velocity (V) of 336 cm/sec is calculated for an Amicon P30-20 polysulfone hollow fiber having an inner radius (R) of 0.025 cm. This velocity is well within the region suitable to ensure laminar flow.

The volumetric flow rate (C) equals the product of the fluid velocity (V) and the cross-sectional area of the lumen ($\pi R^2$, in the case of the Amicon P30-20 fiber membrane having a circular cross-section). Thus a suitable volumetric flow rate is 0.66 cm$^3$/sec.

To determine if the subject solution can pass through the Amicon P30-20 hollow fiber without exceeding the burst pressure (reported as 25 psi in Amicon Publication No. I-116D) consider the flowing formula:

$$Q = \pi (\Delta p / [2\kappa L])^{1/n} (n/[3n+1]) R^{(3n+1)/n}$$

as set forth above in the detailed description. Substituting the known variables including a length (L) of 25 cm, estimates the pressure drop ($\Delta p$) as 13 psi. Since this is considerably lower than the reported burst pressure, a 0.5 weight percent solution of xanthan gum is expected to provide a useful coating or plug fluid for an Amicon P30-20 polysulfone hollow fiber.

For comparison, water passing through an Amicon P30-20 hollow fiber at a fluid velocity (V) of 336 cm/sec and a Reynolds number of 2000 is calculated to have a pressure drop ($\Delta p$) of 15.6 psi. Thus, water may exhibit laminar flow and exhibit a pressure drop less than the recommended maximum inlet operating pressure of 25 psi.

The reader will note that the calculated pressure drop for the water (15.6 psi) is greater than that for the non-Newtonian solution (13 psi). This is an example of the anomalies that occur at high shear rates, i.e., at shear rates beyond those which ensure power law behavior. However, since the calculated pressure drop for the water is less than the burst pressure of the tube and both the xanthan gum solution and the water exist in laminar flow at a fluid velocity of 336 cm/sec, the tube may nonetheless be coated by a highly viscous, non-Newtonian, 0.5 percent aqueous xanthan gum solution.

EXAMPLE 2

As aqueous solution containing 0.5 weight percent xanthan gum is prepared. The solution is centrifuged at low speeds (1,000 rpm) to remove air bubbles. A rheogram reveals the solution to be highly viscous and shear thinning.

A portion of the solution is pushed through an Amicon P30-20 hollow fiber having a length of 41 cm and an inner diameter of 0.05 cm. Pushing is accomplished by injection of the solution with a syringe. Long strings of the polymer solution can be seen exiting the end of the tube remote from the syringe.

EXAMPLE THREE

Preparation of Vinylbenzyldimethylsulfonium Chloride

To a reaction vessel is charged 305.2 grams (2 moles) of vinyl benzyl chloride, 430 grams of methanol, 248.6 grams (4 moles) of dimethyl sulfide and 1,000 milliliters (ml) of deionized water. The resulting mixture is heated at 35° C for one hour with stirring. To the resulting mixture is added 375 ml of water over a 30 minute period. The mixture is then stirred for another 11 hours. The aqueous mixture is separated, washed with hexane twice, and then concentrated by heating at reduced pressure to give a 20 percent vinylbenzyldimethylsulfonium chloride (VBDMS+Cl−) solution.

Preparation of the Terpolymer

To a reaction vessel containing 100 grams water and 100 grams t-butanol is charged 25 grams of hydroxyethyl methacrylate (HEMA), 20 grams of VBDMS+Cl− in 62.3 grams of water, 5 grams of 9N10 methacrylate (a nonylphenoxydecaethoxyethyl methacrylate monomer added to enhance thickening and to improve wettability) in 47.4 grams of water. The mixture is stirred under nitrogen at a temperature of 50° C, while 0.2 gram of t-butyl hydroperoxide in 100 grams of water and 0.15 gram of sodium formaldehyde hydrosulfite (sold under the tradename FORMOPON) in 100 grams of water is added dropwise in separate streams over a period of 3 hours. The polymerization is continued for 1 hour. The t-butanol is then removed by evaporation at reduced pressure.

Preparation of the Coating Solution

A 2 percent aqueous solution of the resulting vinyl addition polymer is prepared. The aqueous solution also includes 0.25 percent on a solids basis of a fluorocarbon surfactant (FLUORAD FC134, available from the 3M Corporation, St. Paul, Minn.) to enhance wetting of the hollow fibers by the aqueous solution. A rheogram reveals the solution to be Newtonian with a viscosity of about 160 centipoise.

EXAMPLE FOUR

An Amicon P30-20 hollow fiber membrane is placed onto a 23 G. needle. A syringe filled with the 2 percent aqueous solution of the vinyl addition polymer of Example Three is attached thereto. The solution is slowly forced by the syringe until about ten drops pass out the end of the membrane tube. The syringe is removed from the needle. An aqueous solution of 0.5 percent xanthan is added to a second syringe that is cut off and has the plunger removed. The second syringe is attached to the needle. The other end is connected to a nitrogen supply. Five (5) psi nitrogen pressure is applied through the syringe to the solution. About 0.2 cc of solution is pushed through the membrane, until long strings are seen at the end of the tube. The syringe is removed. A third empty syringe is attached to the nitrogen supply. The tube is purged with the nitrogen flow. Blowing continues until the gas can flow unobstructed out the end of the tube. The outer surface of the membrane is carefully rinsed with deionized water, and is gently wiped. The membrane is removed from the end of the syringe and is placed in a large evaporating dish. The treated membrane is heated in a forced air oven for about 30 minutes to about 1 hour at 80° C. to cure the coating. The membrane is cooled for about two hours. The process produces a hollow fiber membrane coated with the vinyl addition polymer and the xanthan gum as evidenced by an electron micrograph, see e.g. FIG. 4.

EXAMPLE FIVE

From the rheograms of Examples One (for a 0.5 percent aqueous solution of xanthan gum) and Three (for a 2.0 percent aqueous coating solution), the ratio of the apparent viscosity of the xanthan solution to that of the coating solution at various shear rates is calculated. The ratios are set forth in Table I.

TABLE I

| Shear Rate (rad/sec) | Ratio of Apparent Viscosities 0.5% Xanthan:2.0% Coating |
|---|---|
| 0.01 | 280:1 |
| 0.10 | 74:1 |
| 1.0 | 21:1 |
| 10 | 4.3:1 |
| 100 | 0.9:1 |

This example illustrates typical viscosity ratios for the non-Newtonian aqueous xanthan plug flow fluid and a Newtonian coating solution.

EXAMPLE SIX

One (1.0) gram of xanthan gum is added to 199.0 grams of a 20.3 weight percent solution of bisphenol A sulfonium zwitterion in water as prepared in accordance with Example I set forth in U.S. Pat. No. 4,089,877, herein incorporated by reference. The bisphenol A sulfonium zwitterion solution facilitates the curing of the xanthan and imparts a hydrophilic character to a cured xanthan coating. The mixture is stirred thoroughly to substantially remove any lumps. A small amount of Eosin Y dye is added, coloring the mixture red. The colored mixture is centrifuged at a low speed (1,000 rpm) to remove air bubbles. A rheogram indicates the solution to be highly shear thinning. The computer determined values of the constant ($\kappa$), the exponential constant (n), and the yield value ($\tau_o$), are 16.8 dynes sec/cm$^2$, 0.325, and 15.5 dynes/cm$^2$, respectively.

A larger diameter tube may be coated by filling it while holding it in a vertical position, allowing any non-adhered coating to exit, then placing it in a horizontal position to monitor for any puddling or sagging (which would be signaled by a more intense red color at the point of the puddle or sag).

A 4 mm drying tube coated in accordance with this method exhibits a uniform coating free from puddles or sags.

A 6 mm inner diameter tube and a drying tube having an inner diameter at the bulb of about 2.6 cm and at the neck of about 1.6 cm, coated in accordance with this method, exhibit continuous coatings. However, such coatings appear as a more intense red color at the bottom of the tube, when the tube is laid with its longitudinal axis in a horizontal position.

EXAMPLE SEVEN

Two (2.0) grams of xanthan gum is added to 198.0 grams of a 20.3 weight percent solution of bisphenol A sulfonium zwitterion in water. The mixture is stirred thoroughly to remove lumps. A small amount of Eosin Y dye is added, coloring the mixture red. The colored mixture is centrifuged at a low speed (1,000 rpm) to remove air bubbles. A rheogram indicates the solution to be highly shear thinning. The computer estimated values of the constant ($\kappa$) and the exponential constant (n) and the yield value ($\tau_o$) are 43.4 dynes.sec/cm$^2$, 0.286, and 43.2 dynes/cm$^2$, respectively. This solution has a yield value ($\tau_o$) almost three times as great as the solution of Example Six.

A 6 mm inner diameter tube is coated in accordance with the procedure set forth in Example Five. A more even coating appears, i.e. a coating substantially free from puddles and sags.

Examples Six and Seven illustrate the addition of a rheology control agent (the xanthan gum) to a Newtonian solution that can be cured to provide a coating (the aqueous solution of the bisphenol A sulfonium zwitterion) to render the coating solution non-Newtonian. In each case, the rheology control agent becomes a part of the coating.

EXAMPLE EIGHT

In a one quart AC glass bottle, 1.20 grams of CARBOPOL 940 is added to 598.8 grams of deionized water, while stirring vigorously with a cowles type blade mixer. The solution is mixed for two to three minutes. Upon the addition of 0.52 grams sodium hydroxide pellets, the solution becomes clear and highly viscous. A rheogram reveals the solution as shear thinning. The solution may be pushed through an Amicon P30-20 hollow fiber with a syringe.

EXAMPLE NINE

From the rheograms of Examples Eight (for a 0.2 percent aqueous solution of CARBOPOL 940) and Three (for a 2.0 percent aqueous coating solution) the ratio of the apparent viscosity of the CARBOPOL solution to that of the coating solution at various shear rates is calculated. The ratios are set forth in Table II.

TABLE II

| Shear Rate (sec$^{-1}$) | Ratio of Apparent Viscosities 0.2% CARBOPOL 940:2% coating |
|---|---|
| 0.235 | 538:1 |
| 1.88 | 163:1 |
| 75.2 | 11.8:1 |
| 150.0 | 7.2:1 |
| 301 | 4.3:1 |
| 851 | 2.2:1 |

EXAMPLE TEN

A polyethersulfone hollow fiber with a nominal 30,000 Dalton molecular weight cutoff, an inner diameter of 500 microns, an outer diameter of 800 microns, and a burst pressure of about 227 psi, is placed onto a 23G. needle. A syringe is filled with a 2 percent aqueous solution of a vinyl addition polymer of the following monomers: 50 percent HEMA, 40 percent vinylbenzyltrimethylammonium chloride, and 10 percent 9N10 methacrylate. The polymer is prepared in accordance with the procedure set forth in Example Three. The aqueous solution also includes 0.04 percent of a fluorocarbon surfactant (FLUORAD FC134, available from the 3M Corporation, St. Paul, MN) to enhance wetting of the hollow fibers by the aqueous solution. The solution is slowly forced by the syringe until about 5 to 10 drops pass out the end of the membrane tube. The syringe is removed from the needle. An empty syringe is attached to the needle. Air is pumped by the syringe through the lumen, displacing any non-adhered coating solution. Blowing continues until the air can flow unobstructed out the end of the tube. A second fiber is coated in accordance with this method.

The two coated fibers are irradiated with a 2 million electron volt 250 microamp electron beam for 4 minutes and 2 minutes, respectively to promote crosslinking of the polymer. Two uncoated hydrated fibers are exposed to the same type of beam for 4 minutes and 2 minutes, respectively.

Each of the coated membranes exhibits a salt rejection of about 35 percent with a flux of about 50 GFD, when tested in a reverse osmosis apparatus. Each of the uncoated membranes exhibits essentially no salt rejection and fluxes of about 104 and about 146 GFD, respectively, when similarly tested.

We hereby claim:

1. A method for producing an inner-skinned functionalized tube comprising the consecutive steps of:
   (a) providing an open-ended hollow tube in part defined by:
      (i) at least one inner surface which defines a lumen,
      (ii) two open ends which communicate through the lumen,
      (iii) a longitudinal axis, extending between the open ends through the center of the lumen,
      (iv) a maximum cross-sectional area of the lumen taken perpendicular to the longitudinal axis which is less than about 5 cm$^2$;
   (b) introducing a first coating fluid comprising a first polymer through one of the open ends into the lumen:
   (c) introducing into the lumen a second fluid through an open end such that the second fluid contacts the first coating fluid, the second fluid having non-Newtonian properties and forming a self-centering plug within the first coating fluid in the lumen; and (d) applying the first coating solution to the inner surface by passing the plug through the lumen, coating the inner surface with a first amount of the coating fluid.

2. The method of claim 1, further comprising filling the lumen with the coating fluid prior to the introducing of the second fluid of step (c).

3. The method of claim 1 wherein the applying comprises pushing the coating fluid through the lumen by providing pressure to the open end proximate to the plug.

4. The method of claim 1 wherein the applying comprises providing a vacuum at the end remote from the plug.

5. The method of claim 1 wherein the ordered steps further comprise:
(e) crosslinking the first amount of the coating fluid.

6. The method of claim 5 wherein the crosslinking comprises irradiating the first amount of the coating fluid with a beta or gamma beam.

7. The method of claim 1 wherein a second amount of the second fluid adheres to the first amount of the first fluid, and the ordered steps further comprise:
(e) removing the second fluid less the second amount of the second fluid from the lumen.

8. The method of claim 7 wherein the ordered steps further comprise:
(f) crosslinking the first amount of the coating fluid and the second amount of the second fluid.

9. The method of claim 8 wherein the crosslinking comprises irradiating the first amount and the second amount with a beta or gamma beam.

10. The method of claim 1 wherein the tube is further defined by at least two segments, the cross-sectional area of the lumen throughout one of the segments being greater than the cross-sectional area throughout at least one other of the segments.

11. The method of claim 1 wherein the tube comprises a hollow fiber.

12. The method of claim 11 wherein the hollow fiber is characterized by an average pore size between about 7 and about 30,000 Angstroms.

13. The method of claim 11 wherein the hollow fiber is characterized by an average pore size between about 7 and about 50 Angstroms.

14. The method of claim 1 wherein the coating solution or the plug fluid comprises a vinyl addition polymer of hydroxyethyl methacrylate.

15. The method of claim 1 wherein the coating solution or the second fluid comprises a polyelectrolyte of a vinylbenzyltrialkylammonium salt monomer, and wherein the polyelectrolyte is crosslinked by irradiating with a beta or a gamma beam.

16. A hollow fiber membrane produced in accordance with the method of claim 1.

17. A hollow fiber membrane produced in accordance with the method of claim 14.

18. A hollow fiber membrane produced in accordance with the method of claim 15.

19. A method for producing an inner-skinned functionalized tube comprising the consecutive steps of:
(a) providing a hollow open ended tube in part defined by:
(i) at least one inner surface which defines a lumen,
(ii) two open ends which communicate through the lumen,
(iii) a longitudinal axis of the hollow tube, extending between the open ends through the center of the lumen,
(iv) a maximum cross-sectional area of the lumen taken perpendicular to the longitudinal axis which is less than about 5 cm$^2$;
(b) introducing a coating fluid comprising a polymer through one of the open ends into the lumen, the coating fluid being characterized by non-Newtonian properties; and
(c) applying the coating fluid to the inner surface with fluid distribution means, so as to uniformly coat the inner surface with an amount of the coating fluid wherein the fluid distribution means comprise a pressurized inert fluid provided at the open end proximate the coating solution or pulling the coating fluid through the lumen by a vacuum;
(d) removing the coating fluid less the amount of the coating fluid from the lumen.

20. The method of claim 19 further comprising filling the lumen with the coating fluid during the introducing of step (b).

21. The method of claim 19 wherein the fluid distribution means comprise a pressurized inert fluid provided at the open end proximate the coating solution.

22. The method of claim 19, wherein the fluid distribution means comprise pulling the coating fluid through the lumen by a vacuum.

23. The method of claim 19 wherein the ordered steps further comprise:
(e) crosslinking the amount of the coating fluid.

24. The method of claim 23 wherein the crosslinking comprises irradiating the amount of the coating fluid with a beta or gamma electron beam.

25. The method of claim 19 wherein the tube is further defined by at least two segments, the cross sectional area of the lumen throughout one of the segments being greater than the cross-sectional area throughout at least one other of the segments.

26. The method of claim 19 wherein the coating fluid has Newtonian properties at the point of the introducing of step (b), but which becomes more concentrated at points along the lumen-defining surface during the applying of step (c), thus attaining non-Newtonian and/or higher viscosity properties at such points.

27. The method of claim 19 wherein the tube comprises a hollow fiber.

28. The method of claim 27 wherein the hollow fiber is characterized by an average pore size between about 7 and about 30,000 Angstroms.

29. The method of claim 27 wherein the hollow fiber is characterized by an average pore size between about 7 and about 50 Angstroms.

30. The method of claim 19 wherein the coating fluid comprises a vinyl addition polymer of hydroxyethyl methacrylate.

31. The method of claim 19 wherein the coating fluid comprises a polyelectrolyte of a vinylbenzyltrialkylammonium salt monomer, and wherein the polyelectrolyte is crosslinked by irradiating with a beta or a gamma beam.

32. A hollow fiber membrane produced in accordance with the method of claim 19.

33. A hollow fiber membrane produced in accordance with the method of claim 30.

34. A hollow fiber membrane produced in accordance with the method of claim 31.

* * * * *